A. CHUBB & C. R. MULLEN.
VALVE GEAR.
APPLICATION FILED JULY 22, 1908.
941,189.
Patented Nov. 23, 1909.
3 SHEETS—SHEET 1.
Fig. 1.
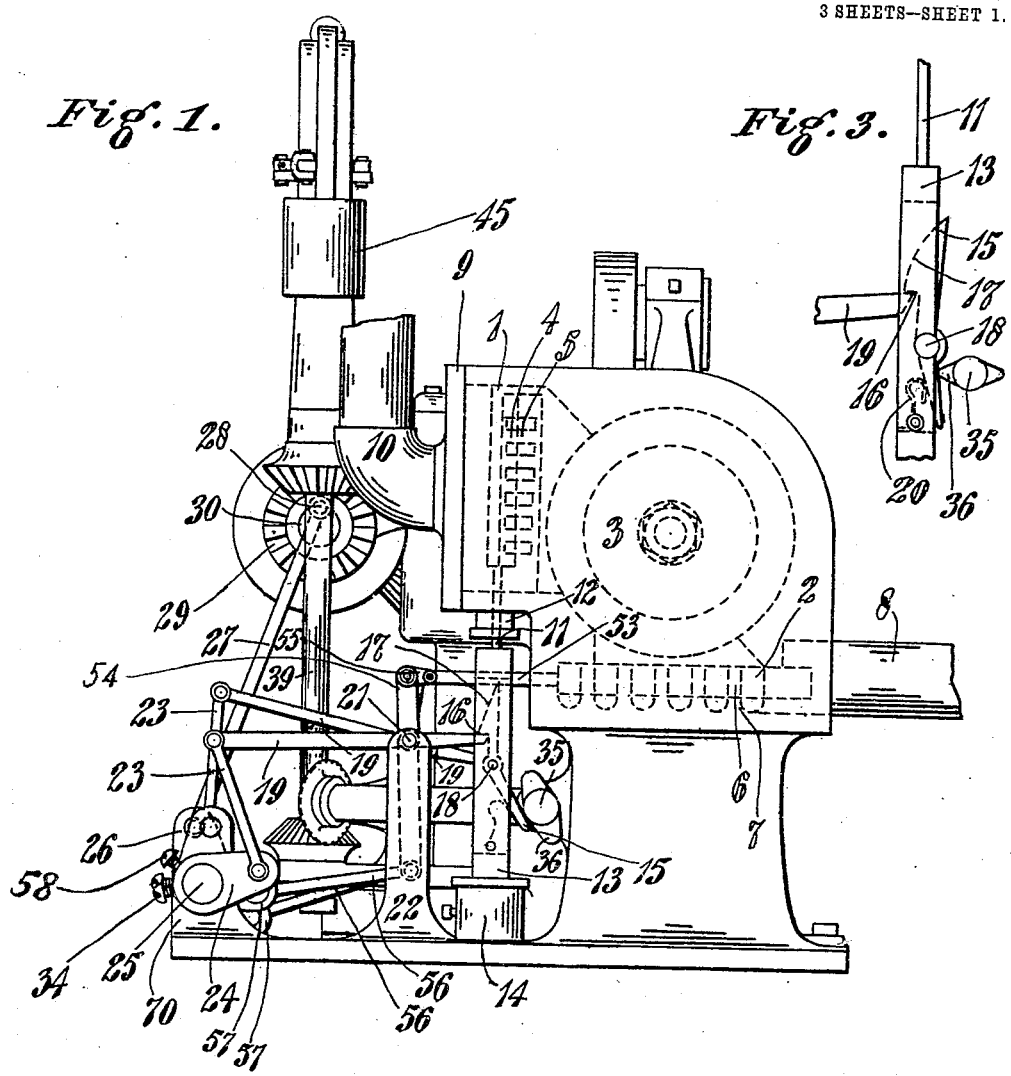
Fig. 3.
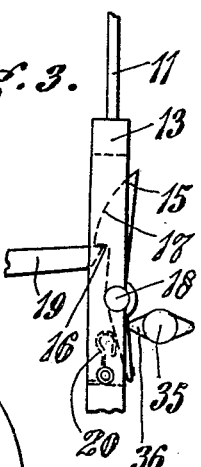
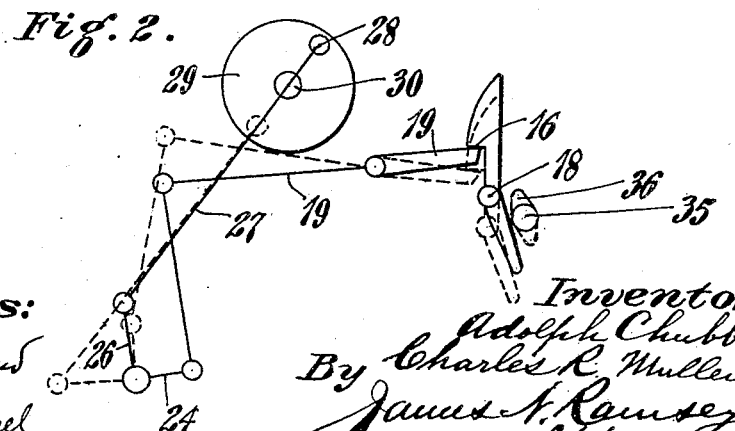
Fig. 2.
Witnesses:
Clarence Fridew
Florence Hammel
Inventors
Adolph Chubb
Charles R. Mullen
By James N. Ramsey
Attorney

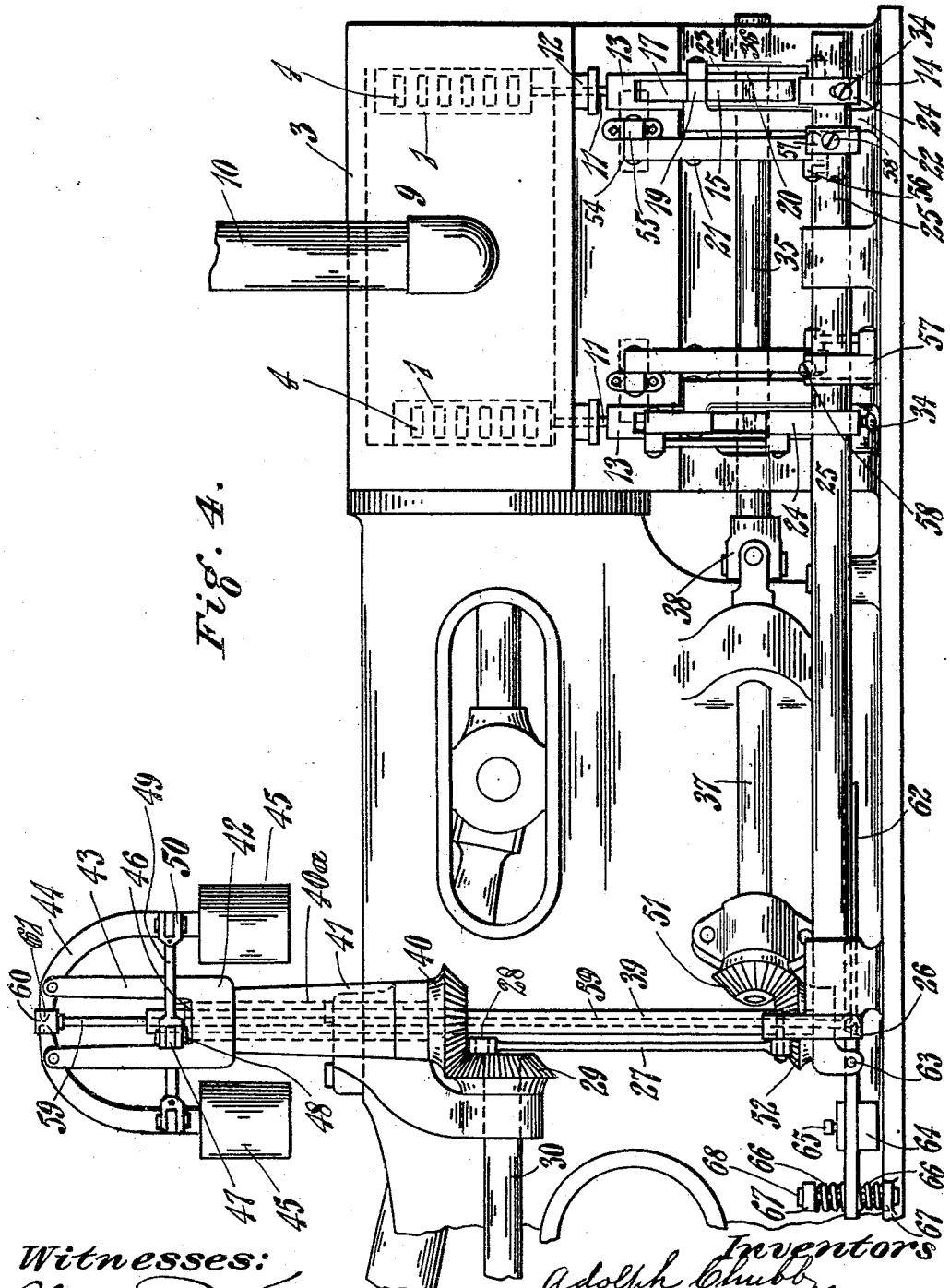

A. CHUBB & C. R. MULLEN.
VALVE GEAR.
APPLICATION FILED JULY 22, 1908.
941,189.
Patented Nov. 23, 1909.
3 SHEETS—SHEET 3.
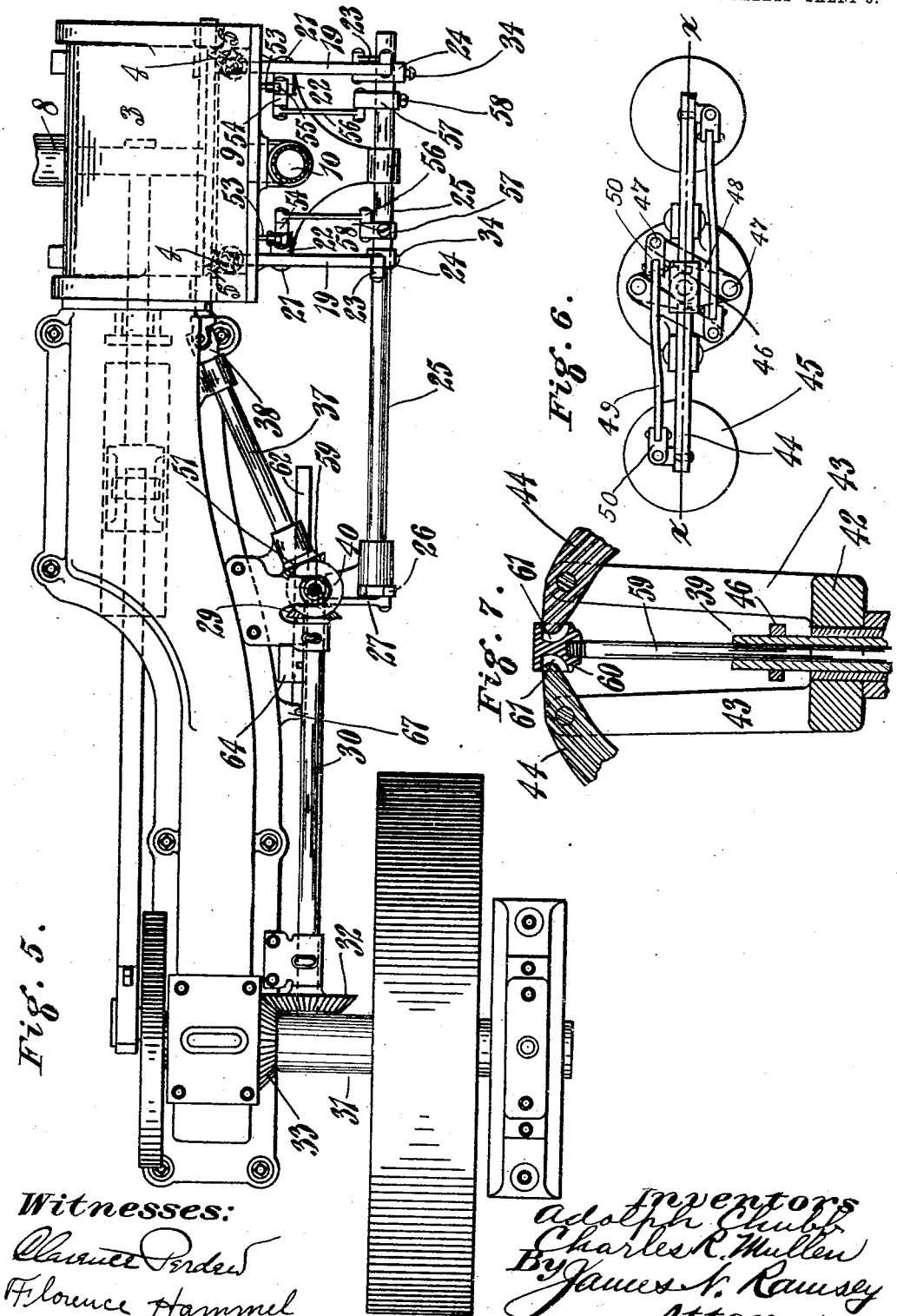
Witnesses:
Inventors
Adolph Chubb
Charles R. Mullen
By James N. Ramsey
Attorney

UNITED STATES PATENT OFFICE.

ADOLPH CHUBB AND CHARLES R. MULLEN, OF CINCINNATI, OHIO.

VALVE-GEAR.

941,189. Specification of Letters Patent. Patented Nov. 23, 1909.

Application filed July 22, 1908. Serial No. 444,864.

*To all whom it may concern:*

Be it known that we, ADOLPH CHUBB and CHARLES R. MULLEN, citizens of the United States, residing at Cincinnati, in the county of Hamilton and State of Ohio, have invented certain new and useful Improvements in Valve-Gears, of which the following is a specification.

Our invention relates to steam engines, of the tripping cut-off variety, and has for its object the more perfect automatic control of the distribution of the steam, and to avoid wire-drawing of the steam during its admission.

Our invention consists in the combination with a slidable valve, of a trip connected to said valve, actuating means for the valve, a continuously rotating wiper for actuating the trip, and means for varying the position of the wiper relative to that of the actuating means for the valve.

Our invention also consists in the parts and in the details of construction and arrangement of parts as will hereinafter be more fully described and claimed.

In the drawings: Figure 1 is an end elevation of part of an engine embodying our invention. Fig. 2 is a diagram more clearly illustrating the operation of the inlet valve actuating lever, the solid lines indicating the position of the various parts when the valve is in raised or open position, and the dotted lines indicating the positions when the valve is in lowered or closed position. Fig. 3 is a detail view more clearly illustrating the operation of the continuously rotating wiper when it actuates the trip. Fig. 4 is a rear elevation of an engine embodying our invention. Fig. 5 is a plan view, reduced, of an engine embodying our invention, parts of the governor being broken away. Fig. 6 is a plan view, enlarged, of part of the governor. Fig. 7 is a partial section on a plane corresponding to the line x—x of Fig. 6.

Constructed as illustrated, our improved valve gear is used in the operation of an engine provided with two separate inlet valves 1 and two separate exhaust valves 2. These valves, as shown, are of the gridiron or multiported construction, and the inlet valves 1 are mounted to slide vertically at the rear of the cylinder 3 of the engine while the exhaust valves 2 are mounted to slide horizontally at the bottom of the cylinder 3. The inlet valves 1 have their ports 4 so positioned as to come into alinement with the ports 5 which communicate with the interior of the cylinder 3 at its ends. The exhaust valves 2 have their ports 6 so positioned that they will come into alinement with the ports 7 which communicate with the exhaust pipe 8.

Preferably, the inlet valves 1 are mounted with their seats in positions diagonal with relation to the axis of the cylinder 3, and the ports 5 also extend diagonally to the axis of the cylinder 3, that is, at an angle of 45° to the axis of the cylinder. Hence, when the steam is admitted to the steam chest 9 through the steam pipe 10 entering the rear thereof, the steam will have a more direct passage through either of the ports 5 to the interior of the cylinder 3 than if the valve seats were mounted parallel with the cylinder.

Each of the inlet valves 1 is provided with a valve stem 11 passing downwardly through the bottom of the steam chest 9, and preferably provided with a stuffing box 12 where it passes through the bottom of the steam chest, and the lower end of each of the valve stems 11 is rigidly secured to a slide 13. The lower end of each of the slides 13 enters a dash-pot 14 (for effecting the quick return of the valve from raised to lowered position), the construction of which being well known need not be illustrated or described in detail herein. Each slide 13 is provided with a trip 15, pivotally mounted thereon and adapted to swing in a vertical plane, having a rearwardly, downwardly facing projection 16 with a rearwardly facing surface 17 extending upwardly and forwardly from the rearward termination of the face of the projection 16 to the end of the trip. The pivotal mounting 18 of the trip is below the projection 16, and below the pivotal mounting 18 the trip extends downwardly and forwardly past the forward side of the slide 13 at such an angle that if the part of the trip below the pivotal connection 18 is engaged, it will draw the part of the trip above the pivotal connection 18 forward sufficiently to disengage the projection 16 from a lever 19 which normally is adapted to engage with said projection 16 to raise the slide 13 and, consequently, raise the inlet valve. Hence, if while the lever 19 is raising the valve 4 through the engagement of its forward end with the projection 16, the part of the trip 15 below the pivotal connection 18 is engaged and pushed backward, so that its projection 16 will be disengaged from the end of the lever 19, then the slide 13, together with the inlet valve 4 to which it is connected, being deprived of support, will quickly return to its lowered position in the manner hereinbefore set forth. For normally holding the trip 15 in position to have its projection 16 engaged by the forward end of the lever 19, we provide the trip with a suitable spring 20 mounted on the slide 13.

The rod 19 which engages with the projection 16 on the trip 15 to actuate the inlet valve 4 is fulcrumed at 21 on a post 22 and extends rearwardly therefrom, a rod 23 being pivotally connected to it near its rearward end. This rod 23 extends downwardly and is connected to a crank 24, mounted on a horizontally journaled shaft 25 so as to oscillate therewith. For oscillating the shaft 25 it is provided with a crank 26 rigidly mounted on it near its end, and to this crank 26 is pivoted one end of a pitman 27, the other end of which is pivoted on a pin 28 in a wheel 29 which is mounted on a horizontal shaft 30 parallel to the shaft 25 and to the axis of the cylinder of the engine. This shaft 30 extends to a point near the crank shaft 31 of the engine, where it is provided with a miter gear 32 in mesh with a miter gear 33 on the crank shaft 31. Thus the shaft 25 will be oscillated once during each revolution of the crank shaft of the engine. The adjustment of the mechanism to give the proper lead to the inlet valve 4 is facilitated by mounting the cranks 24 adjustably on the shaft 25. As illustrated, the adjustable fastening consists of set screws 34.

For actuating the trip 15 a shaft 35 is journaled horizontally, parallel to the shaft 25 and to the axis of the cylinder of the engine. This shaft is provided with wipers 36, one of which is adapted to engage with the trip 15 on the slide 13 of each of the inlet valves 4. The shaft 35 is operatively connected to a shaft 37, running diagonally of the engine, by means of a universal joint 38, of well known construction.

The wheel 29, which transmits motion to the shaft 25, is in the form of a miter gear, and a vertical governor shaft 39 has another miter gear 40 loosely mounted thereon in mesh with the miter gear 29. This miter gear 40 has an elongated hub 40$^a$ extending upward through the bearing 41 and projecting therefrom to receive, above the bearing 41, the hub 42 of the governor, which is rigidly mounted thereon and which has upwardly projecting arms 43, on the upper end of each of which is pivoted one of the pendulum rods 44. These pendulum rods 44 are provided, on their lower ends, with pendulums or weights 45, which are diametrically opposite with relation to the governor shaft 39 and adapted to swing outwardly and inwardly radially thereto. The governor shaft 39 projects somewhat above the elongated hub 40$^a$ of the miter gear 40, and is provided thereabove with the yoke 46, rigidly mounted thereon, which has pivots 47 diametrically opposed with relation to the governor shaft 39 and on a line substantially at right angles to the plane through which the pendulums or weights 45 are adapted to swing. Operatively connected to the yoke by means of the pivots 47 are the links 48, one of each of which extends from one of the pivots 47 past one side of the governor shaft 39 and has pivotally connected to its free end a connecting rod 49, the other end of which connecting rod is pivotally connected to one of the pendulum rods 44 at a point near the pendulum or weight 45 thereon. The movement of the pendulum rods 44 in the swinging of the pendulums or weights 45 being in a plane at right angles to the plane in which the links 48 move, the rods 49 are provided with universal joints 50 at their pivotal connections with the links 48, as well as at their pivotal connections with the pendulum rods 44. Near the lower end of the governor shaft 39 a miter gear 52 is rigidly mounted thereon, and the shaft 37 which extends diagonally of the engine and is operatively connected to the shaft 35 by means of the universal joint 38, as hereinbefore described, is provided with a miter gear 51 rigidly mounted thereon and in mesh with the miter gear 52 on the governor shaft 39.

The continuous rotation of the shaft 35, which carries the wipers 36, is effected from the crank shaft 31 of the engine through the medium of the shaft 30, the diagonal shaft 37 and the universal joint 38. With the motion thus transmitted from the crank shaft 31 to the shaft 35, which carries the wipers 36, through the medium of the pendulum rods 44 of the governor, it will be noted that as long as the pendulums or weights 45 of the governor remain in a constant position, the relative positions of the wipers 36 on the shaft 35 with respect to the positions of the inlet valves, and their operative mechanism will remain constant. Thus, when the engine is running at a low speed, in starting or at any other time when a large quantity of steam is required in its operation, the pendulums or weights 45 of the governor will occupy positions closely inward radially of the governor shaft 39. With the pendulums or weights 45 in such positions the shaft 35, with its wipers 36, may be adjusted in such position relative to the position of the inlet valve 1 and their operative mechanism, that the wipers 36 will not approach the downwardly forwardly extending parts of their corresponding trips 15 until the inlet valves 1 are closely approaching or have reached their lowered positions and have thus effected the cut-off of the steam from the cylinder. Such adjustment of the various parts, it will be seen, will allow the admission of the steam during the full period of oscillation of the lever 19 which actuates each valve 1, which lever, being actuated by means of the crank on the shaft 25, which is oscillated once during each revolution of the crank shaft, may be made to allow admission of steam, with such adjustment, during the full stroke of the engine. On the other hand, if the engine be operating at a constant speed, overcoming a constant load with a constant steam pressure and the load is diminished, the speed of the engine will momentarily rise, as is well known, and the governor, being operatively connected to the crank shaft of the engine, this momentary increase in speed will be accurately communicated to the governor, whereupon the pendulums or weights 45 thereof will swing outwardly radially from the governor shaft 39 and the pendulum rods 44, on which the pendulums or weights 45 are mounted, will, through the medium of the connecting rods 49, links 48 and yoke 46, rotate the governor shaft 39 in advance of the miter gear 40, which is loosely mounted thereon, and, consequently, in advance of the miter gear 29, which is in mesh with the miter gear 40. This advancing of the governor shaft 39 ahead of the miter gear 29 results in the advance of the continuously rotating shaft 35, with its wipers 36, ahead of the oscillating shaft 25, due to the fact that the shaft 35 derives its rotation from the governor shaft 39 while the shaft 25 derives its oscillation from the miter gear 29. Upon this occurrence, instead of the wipers 36 not engaging the forwardly downwardly extending part of the trip 15 until the inlet valve 1 has reached its lowered position, the wiper will be advanced to such an extent that it will engage this forwardly downwardly extending part of the trip 15 while the inlet valve 1 is in its raised position. The more the wiper 36 is advanced, due to the operation of the governor, the nearer will it approach to engaging the trip 15 while the inlet valve 1 is in highest position. Thus, it will be readily seen that, should the speed of the engine become excessively high to such an extent that the pendulums or weights 45 of the governor are thrown outward to the limit of their movement, the wipers 36 will be advanced to such an extent that they would engage with the trips 15 and cause the inlet valve 1 to remain in its lowered position, allowing no admission of steam, which, of course, would result in the rapid decrease of the speed of the engine. When the trip 15 is disengaged from the end of the lever 19, due to the engagement with it of the wipers 36, it, of course, drops immediately, due to the action of the dash-pot 14 and the weight of the valve and other parts, leaving the forward end of the lever 19 in raised position. Then, when the lever 19 is further oscillated, allowing the lowering of its forward end, this forward end will engage with the rearwardly facing surface 17 which extends upwardly and forwardly from the rearward termination of the projection 16 to the end of the trip, with the effect that the upper end of the trip will be pushed forward, allowing the forward end of the lever 19 to again engage under the downwardly facing projection 16 to again lift the inlet valve 1.

For actuating the exhaust valves 2, each one of these valves is provided with a valve stem 53 extending rearwardly through the rear wall of the exhaust chamber of the engine. To the other end of the valve stem 53 the lever 54 is connected by means of a short link 55. This lever 54 extends downwardly and is fulcrumed on the post 22, its pivotal connection therewith being preferably in alinement with the pivotal connection of the lever 19 with the post 22 so that the same pin may be used for both the levers 19 and 54. The lower end of the lever 54 has a rod 56 pivotally connected to it, which extends rearwardly and is pivotally connected to a crank 57, rigidly and adjustably mounted on the oscillating shaft 25, these cranks 57 for the exhaust valves being substantially like the cranks 24, forming part of the inlet valve actuating mechanism, and their adjustment being effected by means of set screws 58. Each crank 57 is so disposed with respect to the lever 54 that it is, at one end of its oscillation, substantially in line with the rod 56 connecting it with the lever 54 when the exhaust valve is in its rearward position, in which it closes the exhaust ports 6. Hence, the crank will, on its return from that end of its oscillation, rapidly increase its motion, which is the motion of the shaft 25 hereinbefore described, so that, on its approach to the other end of its oscillation, it will rapidly open the exhaust port 6, permitting the exhaust during a small period of the stroke of the engine, at the time when the inlet valve at the opposite end of the cylinder is being rapidly opened, thus permitting the full attainment of the advantages due to the rapid cut-off and the period of expansion reached, with the use of the inlet valve actuating mechanism hereinbefore described. The rapid opening and closing of all the valves at all times and under all conditions of the operation of the engine avoids the wire-drawing of the steam both at admission and cut-off.

The governor shaft 39 is tubular in form, and has extending through it the rod 59, upon the upper end of which is a head 60 having oppositely disposed recesses 61, into which the upper inner ends of the pendulum rods 45 extend, and with the interior surfaces of which they engage. The lower end of the rod 59 is pivoted to a bar 62 and this bar is fulcrumed at 63 near the pivotal connection of the bar with the rod 59. The bar 62 extends to a considerable distance in both directions from the pivotal connection with the rod 59, and a weight 64 is slidably mounted on it in such a manner that it may slide past the pivotal connection with the rod 59 and pass the point 63 where the bar 62 is fulcrumed. Thus the weight may be made to depress or to raise the rod 59, depending upon which side of the rod 59 and pivotal point 63 it is placed at. A set screw 65 is provided in the weight for holding it in any desired position on the bar 62. Near the end of the bar 62, on the other side of the pivotal connection 63 from the pivotal connection of the bar with the rod 59, helical springs 66 are preferably interposed between the bar 62 and stationary lugs 67 above and below it, while the pin 68 passes upward through the lugs 67 and through the end of the bar 62 and holds the helical springs 66 from lateral displacement. When the rod 59 is depressed, it will move the pendulum rods 44 so that their lower ends, near which they are connected by means of the connecting rods 49, links 48 and yoke 46 to the governor shaft 39, outward, advancing the shaft 35 and its wipers 36 in the manner hereinbefore described. At the same time, such adjustment will not interfere with the operation of the governor to regulate the speed of the engine but only establishes a different limit of speed regulation for the engine. This regulation, allowing the weight 64 to be disposed either so as to raise or depress the rod 59, always imposes a new condition upon the operation of the governor, in that when the weight is so disposed as to depress the rod 59, the operation of the pendulums or weights 45, upon an increase of speed, will be assisted, while if the weight is so disposed as to tend to depress the rod 59 the operation of the weights or pendulums 45, under the same conditions, will be retarded. The springs 66 afford a compensation for the modified action of the pendulum rods 44 as the weights or pendulums 45 move outwardly on an increase of speed, when such nice adjustment is required.

We claim:

1. In a valve gear, the combination with a slidable valve provided with a valve stem, of a lever having one end adapted to engage to raise the valve stem, an oscillating shaft, a crank on said shaft, a rod connecting the crank on the oscillating shaft to the other end of the lever, the lever being fulcrumed between its ends, and means for oscillating the shaft, the crank at one limit of the oscillation of the shaft being substantially in line with a rod connecting it to the lever, a trip connected to the valve stem forming means for engagement between the lever and the valve stem, a continuously rotating shaft to actuate the trip, and means for varying the position of the continuously rotating shaft relative to that of the oscillating shaft, substantially as and for the purposes set forth.

2. In a valve-gear, the combination with a slidable valve provided with a valve stem, of a lever having one end adapted to engage to raise the valve stem, an oscillating shaft, a crank on the oscillating shaft, a rod pivotally connecting the crank to the other end of the lever, the lever being fulcrumed between its ends, and the crank at one limit of its oscillation being substantially in line with the rod connecting it to the lever, a second crank on the oscillating shaft, a wheel adapted to rotate in unison with the rotation of the crank shaft of the engine, a pin in the wheel disposed away from the center of the wheel, a pitman pivotally connecting the pin with the second crank on the crank shaft, a trip connected to the valve stem and adapted to form means of engagement between the lever and the valve stem, a continuously rotating shaft, a wiper mounted on the continuously rotating shaft to rotate therewith and to actuate the trip, and means for varying the position of the continuously rotating shaft relative to that of the oscillating shaft, substantially as and for the purposes herein set forth.

3. In a valve-gear, the combination with a slidable valve, of a trip connected to said valve, actuating means for the valve, a continuously rotating shaft, a wiper on the continuously rotating shaft adapted to rotate therewith and to actuate the trip, a governor shaft adapted to rotate in unison with the continuously rotating shaft, a governor having a hub adapted to rotate in unison with the operation of the actuating means for the valve, and mechanism forming part of the governor and forming operative connection between the hub of the governor and the governor shaft adapted to be actuated by centrifugal force on the rotation of the hub of the governor in unison with the operation of the valve actuating means whereby the position of the wiper is varied relative to that of the valve actuating means, and means for regulating the mechanism of the governor, whereby the action of the centrifugal force is varied to control the variation of the position of the wiper, substantially as and for the purposes herein set forth.

4. In a valve-gear, the combination with a slidable valve, a trip connected to said valve, of a continuously rotating wiper for actuating the trip, a shaft adapted to transmit motion to the wiper, a governor shaft, a gear loosely mounted thereon and rotated in unison with the crank shaft of the engine, a hub forming part of the governor rigidly secured to the gear loosely mounted on the governor shaft, mechanism forming part of the governor and forming operative connection between the hub of the governor and governor shaft, adapted to be actuated by centrifugal force to vary the position of the governor shaft relative to that of the hub of the governor, operative connection between the governor shaft and the continuously rotating wiper, whereby the wiper rotates in unison with the governor shaft, a lever having one end adapted to engage with the trip connected to the valve to operate the valve, an oscillating shaft, a crank on the oscillating shaft, a rod pivotally connecting the crank with the other end of the lever, the lever being fulcrumed between its ends, a second crank on the oscillating shaft, a wheel adapted to rotate in unison with the rotation of the crank shaft of the engine and with the rotation of the hub of the governor, a pin in the wheel disposed away from the center of the wheel, and a pitman pivotally connecting the pin with the second crank on the crank shaft, whereby the valve is actuated in unison with the rotation of the crank shaft of the engine and whereby the trip is actuated by the wiper and its operation due to the action of the wiper may be varied by the action of the governor automatically during the operation of the engine, substantially as and for the purposes herein set forth.

5. In a valve-gear, the combination with a slidable valve located adjacent to the interior of the cylinder of the engine, and a miter gear on the crank shaft of the engine, a shaft at right angles to the crank shaft of the engine out of line with the valve, a miter gear on said shaft in mesh with the miter gear on the crank shaft of the engine, a vertical governor shaft, a miter gear on the governor shaft and a second miter gear on the shaft which is at right angles to the crank shaft of the engine in mesh with the miter gear on the governor shaft, variable operative connection between the governor shaft and the miter gear thereon, adapted to be actuated by centrifugal force, a continuously rotating shaft parallel to the axis of the cylinder and adjacent to the slidable valve, a second miter gear on the governor shaft adapted to rotate therewith, a miter gear in mesh with the second miter gear on the governor shaft with its axis inclined to the axis of the cylinder of the engine, a universal joint operatively connecting the miter gear which has its axis inclined to the axis of the cylinder to the continuously rotating shaft, whereby continuous rotation is transmitted from the miter gear on the crank shaft of the engine out of line with the slidable valve to the continuously rotating shaft adjacent to the slidable valve, a trip connected to the valve, actuating means for the valve, and a wiper on the continuously rotating shaft for actuating the trip, the position of the wiper relative to the valve actuating means being adapted to be varied by the action of the variable operative connection between the governor shaft and the miter gear thereon, substantially as and for the purposes herein set forth.

6. In a valve-gear, the combination with a slidable valve, of a stem and a slide therefor, and means for effecting the quick return of the valve from raised to lowered position, a trip pivotally mounted on the slide and adapted to swing in a vertical plane, having a rearwardly downwardly facing projection and rearwardly facing surface extending upwardly and forwardly from the rearward termination of the downwardly facing projection to the end of the trip, the pivotal mounting of the trip being below the downwardly facing projection and the trip extending downwardly and forwardly past the forward side of the slide, a lever normally adapted to engage with the downwardly facing projection to raise the slide and the valve, means for actuating the lever in unison with the rotation of the crank shaft of the engine, a continuously rotating shaft journaled horizontally adjacent to the trip, a wiper on the continuously rotating shaft projecting radially therefrom adapted to engage with the trip to actuate it and release it from engagement with the lever, and means for varying the position of the continuously rotating shaft and the wiper thereon with relation to that of the lever, substantially as and for the purposes herein set forth.

7. In a valve-gear, the combination with a slidable inlet valve, of a horizontal slidable exhaust valve, a horizontal oscillating shaft parallel to the axis of the cylinder of the engine, a valve stem and a slide for the inlet valve, a trip on the slide, a lever extending backward from the slide and adapted to engage said trip to raise the slide and inlet valve, a post on which the lever is fulcrumed nearer its end adjacent to the slide than it is to its other end, a valve stem on the horizontal exhaust valve, a lever pivotally connected to the valve stem of the exhaust valve and extending downwardly therefrom fulcrumed nearer its end adjacent to the valve stem than it is to its other end, its fulcrum being on said post, a crank on the horizontal oscillating shaft, a rod pivotally connecting the crank to the other end of the lever which extends backward from the slide of the inlet valve, another crank on the horizontal oscillating shaft, and a rod pivotally connecting it to the lower end of the lever extending downwardly from the valve stem of the exhaust valve, the horizontal oscillating shaft being provided with means for oscillating it in unison with the rotation of the crank shaft of the engine, substantially as and for the purposes herein set forth.

8. In a valve-gear, the combination with slidable valves, of a vertical governor shaft, a gear loosely mounted thereon and in mesh with a gear adapted to transmit motion to it from the crank shaft of the engine, whereby the gear loosely mounted on the governor shaft rotates in unison with the crank shaft of the engine, an elongated hub on the gear loosely mounted on the governor shaft extending upwardly therefrom, a bearing in which the elongated hub is journaled, a governor having a hub rigidly mounted on the elongated hub of the gear and having upwardly projecting arms, pendulum rods pivoted on the upwardly projecting arms, weights on the pendulum rods, a yoke rigidly mounted on the governor shaft above the elongated hub of the gear, links pivoted to the yoke on opposite sides of the governor shaft, connecting rods connecting the links with the pendulum rods, a gear rigidly mounted on the governor shaft, and a gear in mesh therewith, a continuously rotating shaft operatively connected to the gear in mesh with the gear rigidly mounted on the governor shaft, wipers on the continuously rotating shaft, trips connected to the slidable valves adapted to be engaged by the wipers, and actuating means for the valves adapted to be operated in unison with the rotation of the crank shaft of the engine, whereby the positions of the wipers relative to that of the actuating mechanism for the valves is varied, substantially as and for the purposes herein set forth.

9. In a valve-gear, the combination with slidable valves, of a vertical governor shaft, a gear loosely mounted thereon and in mesh with a gear adapted to transmit motion to it from the crank shaft of the engine, whereby the gear loosely mounted on the governor shaft rotates in unison with the crank shaft of the engine, an elongated hub on the gear loosely mounted on the governor shaft extending upwardly therefrom, a bearing in which the elongated hub is journaled, a governor having a hub rigidly mounted on the elongated hub of the gear and having upwardly projecting arms, pendulum rods pivoted on the upwardly projecting arms, pendulums or weights on the pendulum rods, a yoke rigidly mounted on the governor shaft above the elongated hub of the gear, links pivoted to the yoke on opposite sides of the governor shaft, connecting rods connecting the links with the pendulum rods, a gear rigidly mounted on the governor shaft, and a gear in mesh therewith, a continuously rotating shaft operatively connected to the gear in mesh with the gear rigidly mounted on the governor shaft, wipers on the continuously rotating shaft, trips connected to the slidable valves adapted to be engaged by the wipers, and actuating means for the valves adapted to be operated in unison with the rotation of the crank shaft of the engine, a rod extending vertically through the governor shaft, a head on the upper end of the rod engaging with the end of the pendulum rods, a bar pivotally connected to the lower end of the rod and fulcrumed adjacent to its pivotal connection with the rod, and a weight slidably mounted on the rod, whereby the action of the governor may be varied and whereby the positions of the wipers relative to that of the actuating mechanism for the valves is varied, substantially as and for the purposes herein set forth.

10. In a valve-gear, the combination with a valve, and means for actuating the valve, of a vertical governor shaft, a hub for the governor rotatable with respect to the governor shaft, having upwardly projecting arms, pendulum rods pivoted on the arms, a yoke rigidly mounted on the governor shaft, links pivoted to the yoke on opposite sides of the governor shaft and extending past it, connecting rods pivotally connecting the links with the pendulum rods, whereby the position of the governor shaft may be varied with respect to that of the hub of the governor by the action of centrifugal force, substantially as and for the purposes herein set forth.

11. In a valve-gear, the combination with a valve, and means for actuating the valve, of a vertical governor shaft, a hub for the governor, rotatable with respect to the governor shaft, having upwardly projecting arms, pendulum rods pivoted on the arms, a yoke rigidly mounted on the governor shaft, links pivoted to the yoke on opposite sides of the governor shaft and extending past it, connecting rods pivotally connecting the links with the pendulum rods, a rod extending vertically through the governor shaft, a head on the upper end of the rod engaging with the ends of the pendulum rods, a bar pivotally connected to the lower end of the rod and fulcrumed adjacent to its pivotal connection with the rod, and a weight slidably mounted on the rod, whereby the action of the governor may be varied, and whereby the position of the governor shaft may be varied, with respect to that of the hub of the governor by the action of centrifugal force, substantially as and for the purposes herein set forth.

12. In a valve-gear, the combination with a valve, and means for actuating the valve, of a vertical governor shaft, a hub for the governor, rotatable with respect to the governor shaft, having upwardly projecting arms, pendulum rods pivoted on the arms, a yoke rigidly mounted on the governor shaft, links pivoted to the yoke on opposite sides of the governor shaft and extending past it, connecting rods, pivotally connecting the links with the pendulum rods, a rod extending vertically through the governor shaft, a head on the upper end of the rod engaging with the ends of the pendulum rods, a bar pivotally connected to the lower end of the rod and fulcrumed adjacent to its pivotal connection with the rod, and a weight slidably mounted on the rod, a spring in engagement with one end of the bar adapted to modify the action of the weight on the bar and on the governor whereby the action of the governor may be varied.

ADOLPH CHUBB.
CHARLES R. MULLEN.

Witnesses:
JAMES N. RAMSEY,
CLARENCE PERDEN.